United States Patent [19]

Okada et al.

[11] Patent Number: 5,009,480
[45] Date of Patent: Apr. 23, 1991

[54] FIBER OPTIC GYRO

[75] Inventors: Kenichi Okada; Masashi Nishino; Shu Tanigawa, all of Tokyo, Japan

[73] Assignee: Japan Aviation Electronics Industry Limited, Tokyo, Japan

[21] Appl. No.: 562,605

[22] Filed: Aug. 3, 1990

[30] Foreign Application Priority Data

Aug. 11, 1989 [JP] Japan ................. 1-208860
Oct. 13, 1989 [JP] Japan ................. 1-267582

[51] Int. Cl.$^5$ .......................... G02B 6/26; G01B 9/02
[52] U.S. Cl. .................. 350/96.15; 350/96.13; 356/350
[58] Field of Search ............... 350/96.10, 96.11, 96.12, 350/96.13, 96.14, 96.15, 96.16, 96.29, 96.30; 356/349, 350, 351

[56] References Cited

U.S. PATENT DOCUMENTS

| 4,545,682 | 10/1985 | Greenwood | 356/350 |
| 4,687,330 | 8/1987 | Lefevre | 356/350 |
| 4,717,256 | 1/1988 | Ensley et al. | 356/350 |
| 4,728,192 | 3/1988 | Shaw et al. | 356/350 |
| 4,796,993 | 1/1989 | Sonobe et al. | 356/350 |
| 4,840,489 | 6/1989 | Coccoli | 356/350 |
| 4,842,358 | 6/1989 | Hall | 350/96.15 |
| 4,848,910 | 7/1989 | Dupraz | 356/350 |
| 4,887,900 | 12/1989 | Hall | 356/350 |
| 4,906,096 | 3/1990 | Pavlath | 356/350 |
| 4,915,503 | 4/1990 | Pavlath | 356/350 |

Primary Examiner—Brian Healy
Attorney, Agent, or Firm—Pollock, Vande Sande & Priddy

[57] ABSTRACT

In a fiber optic gyro in which a biasing phase modulator and a ramp phase modulator are provided at the one end and the other end of an optical fiber coil, a biasing voltage and a ramp voltage are applied to the phase modulators to induce a phase difference between two rays of light which propagate through the optical fiber coil in opposite directions, the interference light is detected by a photodetector, the phase difference component is obtained from the photodetector output by a synchronous detector, and the synchronous detector output is used to control the polarity and the frequency of the ramp voltage, an external signal is added to the synchronous detector, output to fluctuate the frequency of the ramp voltage, or a component of an image frequency spaced apart from the frequency of the biasing voltage by a value twice the intermediate frequency is removed by a subtractor from the synchronous detector output, thereby improving the scale factor of the fiber optic gyro.

7 Claims, 7 Drawing Sheets

FIBER OPTIC GYRO

BACKGROUND OF THE INVENTION

The present invention relates to a fiber optic gyro of a zero serrodyne modulation system employing a linear phase ramp voltage.

There has been proposed a wide-dynamic-range, low-drift fiber optic gyro of the type having a biasing phase modulator and a ramp phase modulator connected to the one and the other end of an optical fiber coil, respectively. A biasing voltage and a ramp voltage are applied to the biasing phase modulator and the ramp phase modulator, respectively, to thereby provide a phase difference between two rays of light propagating through the optical fiber coil in opposite directions. The phase difference between the two rays of light which propagate through the optical fiber coil and interfere with each other is detected from the output of a photodetector. The detected output is used to control the polarity and the frequency of the ramp voltage so that the phase difference may assume a predetermined value.

Figure 1:
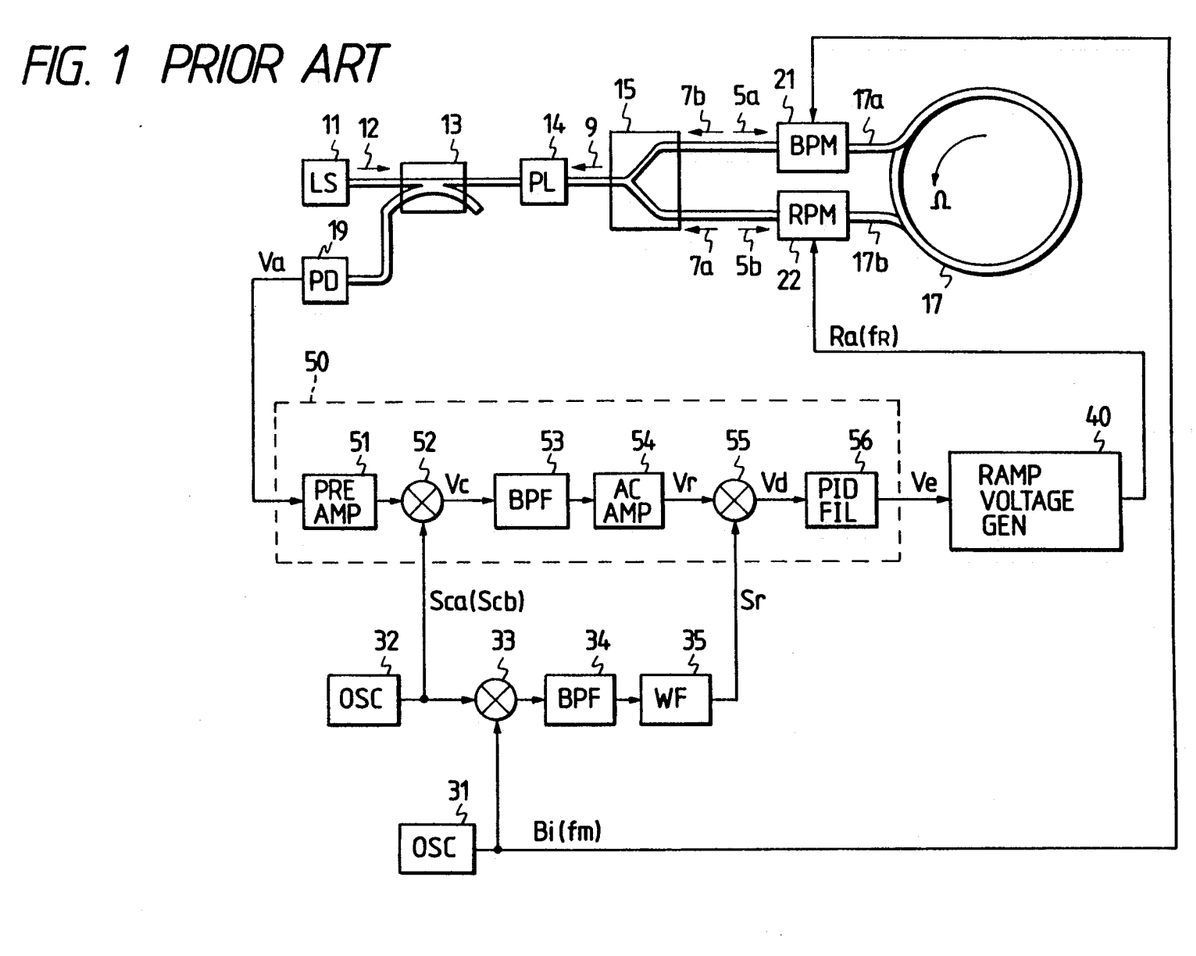
FIG. 1 is a block diagram showing an example of a conventional fiber optic gyro.

FIG. 1 shows an example of such a conventional fiber optic gyro.

Light 12 emitted from a light source 11 is provided via an optical coupler 13 and a polarizer 14 to an optical coupler 15, wherein it is split into two rays of light 5a and 5b. The one light 5a and the other light 5b are supplied to an optical fiber coil 17 at the one and the other end 17a and 17b thereof, respectively, and propagate therethrough as right-handed light and left-handed light. The two rays of light 7a and 7b having thus propagated through the optical fiber coil 17 are supplied therefrom at the ends 17b and 17a to the optical coupler 15, wherein they interfere with each other. The resulting interference light 9 is provided via the polarizer 14 and the optical coupler 13 to a photodetector 19 for conversion into an electric signal as in ordinary fiber optic gyros.

A biasing phase modulator 21 is disposed between the optical coupler 15 and the one end 17a of the optical fiber coil 17 and a ramp phase modulator 22 between the optical coupler 15 and the other end 17b of the optical fiber coil 17. A biasing voltage Bi is applied from an oscillator 31 to the biasing phase modulator 21 for phase shifting the light 5a to be supplied to the optical fiber coil 17 at the one end 17a thereof and the light 7b having propagated through the optical fiber coil 17 from the other end 17b thereof and to be supplied to the optical coupler 15 from the one end 17a of the optical fiber coil 17. At the same time, a ramp voltage Ra is applied from a ramp voltage generator 40 to the ramp phase modulator 22 for phase shifting the light 5b to be supplied from the other end 17b of the optical fiber coil 17 and the light 7a having propagated through the optical fiber coil 17 from the one end 17a thereof and to be supplied from the other end 17b of the optical fiber coil 17 to the optical coupler 15. The output Va of a photodetector 19 is applied to a phase difference detect/control section 50 described later, wherein the phase difference between the two rays of light 7a and 7b interfering with each other in the optical coupler 15 is detected as described later. The output Ve of the phase difference detect/control section 50 is applied to the ramp voltage generator 40 to control the polarity and the frequency of the ramp voltage Ra so that the above-mentioned phase difference may reach a predetermined value, that is, the sum $\Delta\phi$ of a Sagnac phase difference $\Delta\phi_s$ which is caused by the application of an angular rate $\Omega$ to the optical fiber coil 17 and the phase difference $\Delta\phi_r$ which is caused by the application of the ramp voltage Ra to the ramp phase modulator 22 may be zero or an integral multiple of $2\pi$ rad.

Figure 2:
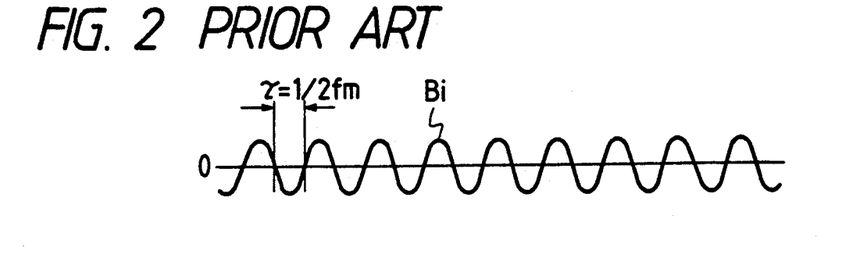
FIG. 2 is a waveform diagram of a biasing voltage in FIG. 1.

The biasing voltage Bi is a sine-wave voltage of a frequency $f_m$ the half period of which corresponds to the time $\tau$ necessary for the propagation of the two rays of light 5a and 5b through the optical fiber coil 17 as shown in FIG. 2. The phase modulation by the biasing phase modulator 21 supplied with such a biasing voltage is to provide a phase difference of $\pi/2$ rad. between the two rays of light 7a and 7b which have propagated through the optical fiber coil 17 in opposite directions and interfere with each other, thereby setting an operating point of the fiber optic gyro.

Figure 3:
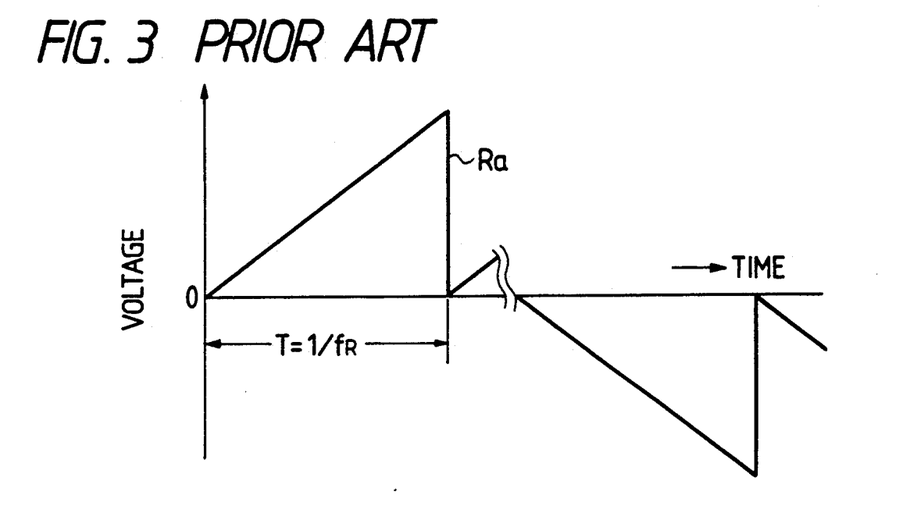
FIG. 3 is a waveform diagram of a ramp voltage in FIG. 1.

The ramp voltage Ra goes positive or negative as depicted in FIG. 3. By the phase modulation in the ramp phase modulator 22 supplied with such a ramp voltage the two rays of light 7a and 7b which have propagated through the optical fiber coil 17 in opposite directions and interfere with each other are phase shifted from 0 to $2k\pi$ rad. (where $k = \pm 1, \pm 2, \ldots$), up to $\pm 2\pi$ in practice, as indicated by $\phi_a$ and $\phi_b$ in FIG. 4. By controlling the period T of the ramp voltage Ra the changing ratios (i.e. gradients) of the phase shifts $\phi_a$ and $\phi_b$ of the two rays of light 7a and 7b are changed, by which the difference between the phase shifts $\phi_a$ and $\phi_b$, that is, the phase difference $\Delta\phi_r$, is controlled to cancel the Sagnac phase difference $\Delta\phi_s$ as mentioned above.

The difference between the phase difference between the two rays of light 7a and 7b interfering with each other in the optical coupler 15 and the phase difference between them introduced by the biasing phase modulator 21 is equal to the sum of the Sagnac phase difference $\Delta\phi_s$ and the phase difference $\Delta\phi_r$ introduced by the ramp phase modulator 22 as given below:

$$\Delta\phi = \Delta\phi_s + \Delta\phi_r \tag{1}$$

As is well-known in the art, the Sagnac phase difference $\Delta\phi_s$ is expressed as follows:

$$\Delta\phi_s = \frac{4\pi RL}{\lambda C} \Omega \tag{2}$$

where R is the radius of the optical fiber coil 17, L is the length of the optical fiber coil 17, $\lambda$ is the wavelength of light which propagates through the optical fiber coil 17, and C is the velocity of light in a vacuum.

As described above, in the ramp phase modulator 22, the light 5b which is supplied to the optical fiber coil 17 at its one end 17b is subjected to the phase shift $\phi_b$ corresponding to the value of the ramp voltage Ra at that time and after the elapse of time $\tau$ the light 7a which has propagated through the optical fiber coil 17 from the end 17a thereof and is supplied to the optical coupler 15 through the end 17b of the optical fiber coil 17 is subjected to the phase shift $\phi_a$ corresponding to the value of the ramp voltage Ra at that time. When the angular rate $\Omega$ is applied clockwise and the Sagnac phase difference $\Delta\phi_s$ goes negative, the ramp voltage Ra is controlled to be positive by the output Ve of the phase difference detect/control section 50 as shown at the left-hand side in FIG. 3. In this instance, the phase shifts $\phi_a$ and $\phi_b$ bear such a relationship as shown at the left-hand side in FIG. 4 and the phase difference $\Delta\phi_r$ resulting from the application of the ramp voltage Ra to the ramp phase modulator 22 goes positive. Where the angular/rate $\Omega$ is applied counterclockwise and the Sagnac phase difference $\Delta\phi_s$ goes positive, the ramp voltage Ra is made negative by the output Ve of the phase difference detect/control section 50 as shown at the right-hand side in FIG. 3, in consequence of which the phase shifts $\phi_a$ and $\phi_b$ bear such a relationship as depicted at the right-hand side in FIG. 4, rendering the phase difference $\Delta\phi_r$ negative.

Figure 4:
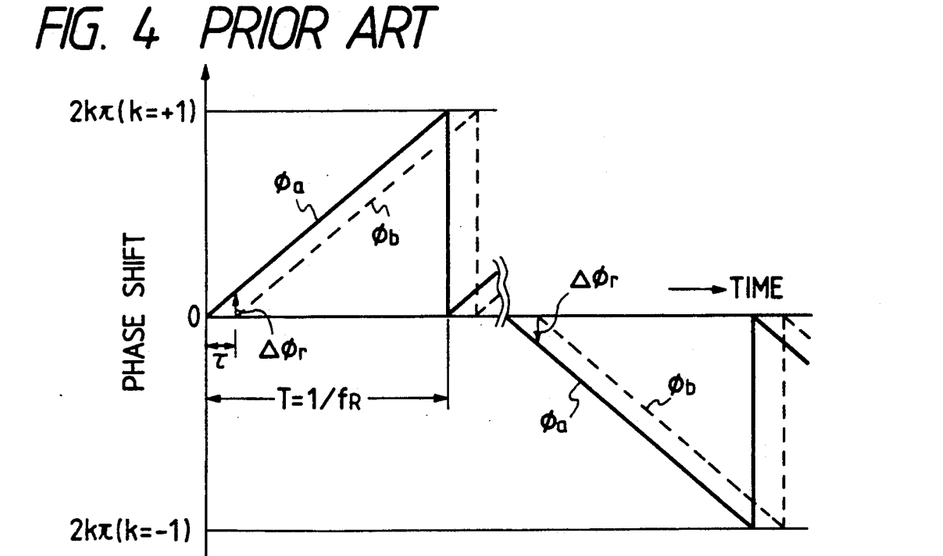
FIG. 4 is a graph showing phase shifts of light by a ramp phase modulator in FIG. 1.

As will be seen from FIG. 4, letting the period and the frequency of the ramp voltage Ra be represented by T and $f_R$, respectively, the following equation holds:

$$\Delta\phi_r = 2k\pi\frac{\tau}{T} = 2k\pi \cdot \tau f_R \quad (3)$$

Letting the refractive index of light in the optical fiber coil 17 be represented by n, the following relationship exists:

$$\tau = \frac{nL}{C} \quad (4)$$

Hence, substitution of Eq. (4) into Eq. (3) gives the following equation:

$$\Delta\phi_r = 2k\pi\frac{nL}{C}f_R \quad (5)$$

Thus, by controlling the polarity and the frequency $f_R$ of the ramp voltage Ra so that the phase difference $\Delta\phi$ expressed by Eq. (1) may be reduced to zero, that is, $$\Delta\phi_r = -\Delta\phi_s \quad (6)$$

the frequency $f_R$ is obtained from Eqs. (2) and (5) as follows:

$$\begin{aligned} f_R &= \frac{C \cdot \Delta\phi_r}{2k\pi \cdot nL} \\ &= -\frac{C}{2k\pi \cdot nL} \times \frac{4\pi RL}{\lambda C}\Omega \\ &= -\frac{2R \cdot \Omega}{kn\lambda} \end{aligned} \quad (7)$$

From Eq. (7) the input angular/rate $\Omega$ is expressed by the following equation:

$$\Omega = -\frac{kn\lambda}{2R}f_R \quad (8)$$

In the case where the angular rate $\Omega$ is applied clockwise, i.e. in the negative direction and the ramp voltage Ra goes positive, k becomes $+1$, and in the case where the input angular rate $\Omega$ is applied counterclockwise, i.e. in the positive direction and the ramp voltage Ra goes negative, k becomes $-1$. Accordingly, the direction and the magnitude of the input angular rate $\Omega$ can be measured from the polarity and the frequency $f_R$ of the ramp voltage Ra. The actual fiber optic gyro includes a polarity detector for detecting the polarity of the ramp voltage Ra and a counting circuit for counting the frequency $f_R$ (or period T) of the ramp voltage Ra, but they are not shown in FIG. 1 for the sake of brevity. Incidentally, in the case where the angular rate $\Omega$ is applied to the optical fiber coil 17, the coil 17 makes one rotation in a time $2\pi/\Omega$ and the number of ramp pulses which are generated in this period, $2\pi \cdot f_R/\Omega$, becomes $-4\pi R/(kn\lambda)$ from Eq. (7) and is constant irrespective of the input angular rate $\Omega$. The number of pulses per rotation is referred to as a scale factor.

Letting the frequency and the angular frequency of the biasing voltage Bi be represented by $f_m$ and $\omega_m$, respectively, the output Va of the photodetector 19 is expressed as follows:

$$\begin{aligned} Va = Vdc &+ Ka\sum_{n=1}^{\infty}(-1)^n J_{2n}(x)\cos\Delta\phi \cdot \cos 2n\omega_m t \\ &- Kb\sum_{n=0}^{\infty}(-1)^n J_{2n+1}(x)\sin\Delta\phi \cdot \cos(2n+1)\omega_m t \end{aligned} \quad (9)$$

In the above, Vdc is a DC component, Ka and Kb are constants, $J_{2n}(x)$ and $J_{2n+1}(x)$ are Bessel functions of the first kind, the first term of Eq. (9) is a DC component, the second term is a component of a frequency which is an even-numbered multiple of the frequency $f_m$ of the biasing voltage Bi, and the third term is a component of a frequency which is an odd-numbered multiple of the frequency $f_m$.

In the phase difference detect/control section 50, only that one of the components expressed in the third term of Eq. (9) which has the frequency $f_m$ when $n=0$ is extracted from the output Va of the photodetector 19, the component of the frequency $f_m$ is synchronously detected by a reference signal of the same frequency, and the following detected output is obtained as the output having detected the phase difference between the two rays of light 7a and 7b which interfere with each other in the optical coupler 15:

$$Vd = Kc \cdot J_1(x)\sin\Delta\phi \quad (10)$$

where Kc is a constant.

Figure 5:
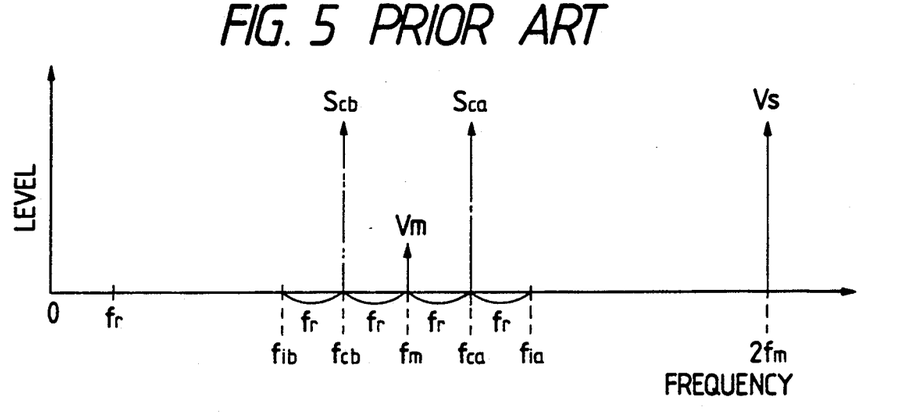
FIG. 5 is a graph showing the relationship between signals to be mixed by a frequency mixer in FIG. 1 and the frequency of its mixed output.
Figure 6:
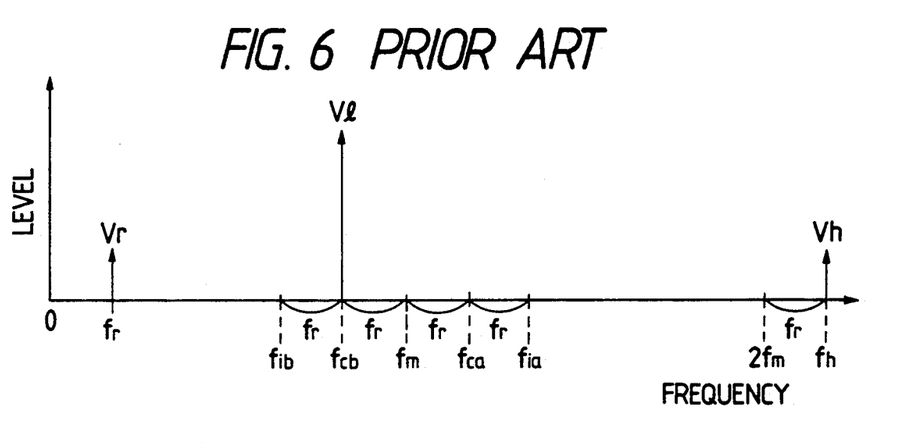
FIG. 6 is a graph showing typical frequency components in the output of the frequency mixer in FIG. 1.

Since the polarity and the frequency $f_R$ of the ramp voltage Ra is controlled so that the phase difference $\Delta\phi$ may be reduced to zero as described previously, however, a component Vm of the frequency $f_m$ contained in the third term of Eq. (9) becomes very low in level as shown in FIG. 5, whereas a component Vs of a frequency $2f_m$ contained in the second term of Eq. (9) becomes considerably higher in level as shown. In addition, the frequency $f_m$ of the biasing voltage Bi is usually set so that its half period corresponds to the time $\tau$ necessary for the propagation of light 5a and 5b through the optical fiber coil 17, as follows:

$$f_m = \tfrac{1}{2}\tau \quad (11)$$

Substitution of Eq. (11) into Eq. (4) gives $$f_m = C/2nL \quad (12)$$

More specifically, assuming, for example, that the refractive index n of light in the optical fiber coil 17 is 1.47 and the length L of the optical fiber coil 17 is 300 m, the frequency $f_m$ rises as high as about 430 kHz. In the case where the output Va of the photodetector 19 is applied directly to a band-pass filter whose center frequency is $f_m$, its pass bandwidth becomes so wide that it is impossible to accurately eliminate the component Vs of the frequency $2f_m$ from the output Va and extract only the component Vm of the frequency $f_m$ at a sufficient level.

To avoid this, the output Va of the photodetector 19 is mixed with a local signal of a frequency $f_{ca}=f_m+f_r$ or $f_{cd}=f_m-f_r$, slightly different from the frequency $f_m$, by which the component $V_m$ of the frequency $f_m$ is converted to an intermediate frequency $f_r$ sufficiently lower than the frequency $f_m$. The mixed output is applied to a band-pass filter whose center frequency is the intermediate frequency $f_r$ and only the component of the intermediate frequency $f_r$ is obtained from the band-pass filter. This component is synchronously detected by a reference signal of the same frequency $f_r$, by which the detected output Vd expressed by Eq. (10) is obtained.

This will be described with reference to FIG. 1. The output Va of the photodetector 19 is applied to a preamplifier 51, by which its DC component Vdc is removed and its AC component is amplified. The AC component is fed to a frequency mixer 52, in which it is mixed with a local signal Sca of the frequency $f_{ca}$ from an oscillator 32. The frequency $f_{ca}$ is a little higher than the frequency $f_m$ as shown in FIG. 5. The frequency mixer 52 produces an output Vc containing components Vr and Vh of the difference and the sum of the frequencies $f_m$ and $f_{ca}$, a component Vl of the difference between the frequencies $2f_m$ and $f_{ca}$, etc. The output Vc of the frequency mixer 52 is applied to a band-pass filter 53 whose center frequency is the intermediate frequency $f_r$. The intermediate frequency $f_r$ is selected to be 10 kHz, for instance. Since the center frequency $f_r$ of the band-pass filter 53 is selected to be markedly lower than the frequency $f_m$, the pass bandwidth of the filter 53 can be made sufficiently narrow. Of the components contained in the output Vc of the frequency mixer 52, the components except for the component Vr of the frequency $f_r$ are of the frequencies higher than the frequency $f_{cb}$ $(=f_m-f_r)$; so that the filter 53 provides only the component Vr of the frequency $f_r$, that is, the component of the frequency $f_r$ converted from the component $V_m$ of the frequency $f_m$ contained in the output Va of the photodetector 19.

The component Vr of the intermediate frequency $f_r$ thus provided from the band-pass filter 53 is amplified by an AC amplifier 54 to a sufficient level and is then supplied to a synchronous detector 55, in which it is synchronously detected by a reference signal Sr of the frequency $f_r$ and from which the detected output Vd expressed by Eq. (10) is obtained as the detected output of the phase difference between the light 7a and 7b interfering with each other in the optical coupler 15. The output Vd of the synchronous detector 55 is fed to a PID (Proportional plus Integral plus Derivative) filter 56, the output Ve of which is provided, as the output of the phase difference detect/control section 50, to the ramp voltage generator 40 to control the polarity and the frequency $f_R$ of the ramp voltage Ra so that the phase difference $\Delta\phi$ may be reduced to zero.

In the frequency mixer 52 a local signal Scb of the frequency $f_{cb}=f_m-f_r$ may be used in place of the local signal Sca of the frequency $f_{ca}=f_m+f_r$.

The reference signal Sr of the frequency $f_r$ for synchronous detection is produced as follows: The biasing voltage Bi of the frequency $f_m$, yielded from the oscillator 31, and the local signal Sca or Scb of the frequency $f_{ca}=f_m+f_r$ or $f_{cb}=f_m-f_r$, provided from the oscillator 32, are mixed together in a frequency mixer 33. The mixed output is supplied to a band-pass filter 34, from which only a signal of the intermediate frequency $f_r$ is obtained, and this signal is provided to a waveform shaping circuit 35, from which the reference signal Sr is obtained as a rectangular-wave signal of the frequency $f_r$.

The ramp voltage Ra which is applied to the ramp phase modulator 22 is shown to be an ideal ramp voltage which has no fly-back time in FIG. 3, but in practice, it is impossible to reduce the fly-back time of the ramp voltage Ra to zero and the ramp voltage Ra has a fly-back time of tens of nanoseconds or more. Furthermore, it is also impossible, in practice, owing to the characteristics of the ramp voltage generator 40 and the ramp phase modulator 22 that the maximum values of the phase shifts $\phi_a$ and $\phi_b$ by the ramp phase modulator 22 are set accurately to $\pm 2\pi$ rad.

Figure 7:
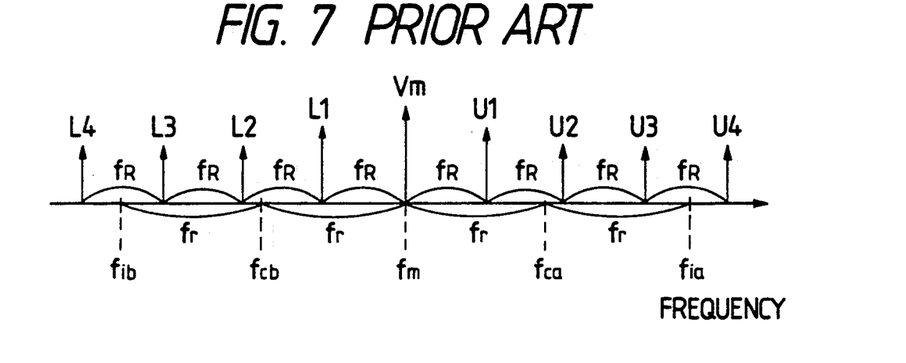
FIG. 7 is a graph showing the relationship between the frequency component of the ramp voltage to be applied to the frequency mixer in FIG. 1 and the frequency of its side-band wave component.

Since the fly-back time exists in the ramp voltage Ra and since the maximum values of the phase shift $\phi_a$ and $\phi_b$ do not become $\pm 2\pi$ rad accurately, the phase difference between the two rays of light 7a and 7b which have propagated through the optical fiber coil 17 in the opposite directions and interfere with each other has an error composed of the fundamental wave component of the frequency $f_R$ of the ramp voltage and harmonic components of frequencies which are integral multiples of the fundamental frequency. This error appears as upper and lower side-band components U1, U2, ... and L1, L2, ... of the component $V_m$ of the frequency $f_m$ in the output Va of the photodetector 19, as shown in FIG. 7. In addition, since the frequency $f_R$ of the ramp voltage Ra varies with the input angular velocity $\Omega$, the frequencies of the upper and lower side-band wave components U1, U2, ... and L1, L2, ... also vary with the input angular velocity $\Omega$.

Figure 8:
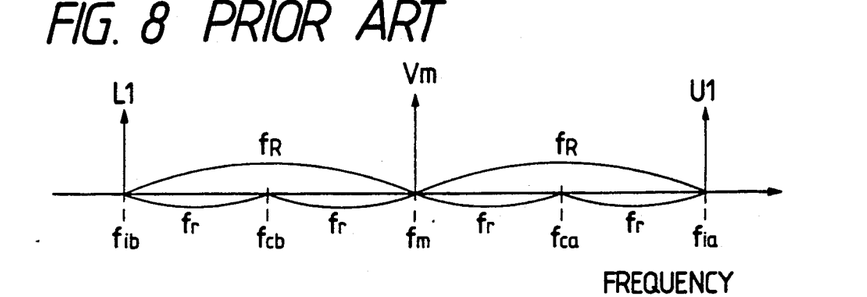
FIG. 8 is a graph showing an example of the relationship between the image frequency to be input into the frequency mixer in FIG. 1 and the frequency of its side-band wave.
Figure 9:
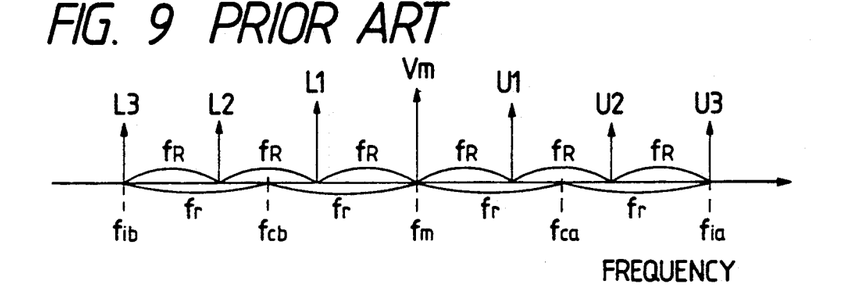
FIG. 9 is a graph showing another example of the relationship between the image frequency to be input into the frequency mixer in FIG. 1 and the frequency of its side-band wave.

On this account, when the frequency $f_R$ is equal to a twofold value of the frequency $f_r$ of the reference signal Sr for the aforementioned synchronization in the phase difference detect/control section 50, the upper or lower side-band wave component U1 or L1 agrees with a frequency $f_{ia}=f_m+2f_r$ or $f_{ib}=f_m-2f_r$, respectively, as shown in FIG. 8 and when a threefold value of the frequency $f_R$ is equal to the twofold value of the frequency $f_r$, the upper or lower side band wave component U3 or L3 agrees with the frequency $f_{ia}$ or $f_{ib}$, respectively, as depicted in FIG. 9. In the presence of a specific input angular velocity which provides $f_R=f_r/n$ (where n is 1, 2, 3, ...), any one of the upper side band wave components U1, U2, ... or any one of the lower side band wave components L1, L2, ... agrees with the image frequency $f_{ia}$ or $f_{ib}$ of the frequency $f_m$ corresponding to the frequency $f_{ca}$ or $f_{cb}$ of the local signal Sca or Scb. Hence, the upper or lower side-band wave is mixed with the local signal Sca or Scb in the frequency mixer 52, that is, the above-mentioned side-band wave is converted to the intermediate frequency $f_r$ together with the component $V_m$ of the frequency $f_m$. The side-band component thus converted to the intermediate frequency $f_r$ is provided via the band-pass filter 53 to the AC amplifier 54 and the amplified output is supplied to the synchronous detector 55, thus introducing a scale factor error into the output of the fiber optic gyro.

The scale factor error becomes maximum when the upper or lower side-band wave component U1 or L1 corresponding to the fundamental wave component of the frequency $f_R$ of the ramp voltage Ra agrees with the image frequency $f_{ia}$ or $f_{ib}$, respectively, as shown in FIG. 8. On the other hand, when the upper or lower side-band wave component U3 or L3 corresponding to a harmonic component which is an integral multiple of the frequency $f_R$ agrees with the image frequency $f_{ia}$ or $f_{ib}$, the scale factor error decreases in general as shown in FIG. 9.

Figure 10:
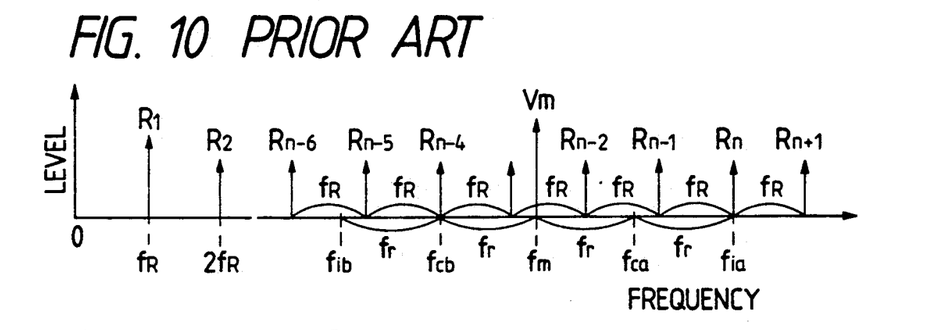
FIG. 10 is a graph showing the relationships between the fundamental and harmonic wave components of the ramp voltage and the image frequency which are applied to the frequency mixer in FIG. 1.

The ramp phase modulator 22 usually has a single-mode optical waveguide formed as by diffusing titanium into an electro-optic crystal as of lithium niobate and a pair of electrodes disposed opposite across the optical waveguide. By the application of the ramp voltage Ra across the pair of electrodes the refractive index of the optical waveguide is changed to shift the phase of light passing therethrough. In this instance, a portion of the light passing through the optical waveguide leaks out therefrom in accordance with the value of the applied voltage, and consequently, the intensity of light passing through the optical waveguide is modulated by the ramp voltage Ra and variation in the light intensity appears, in the output Va of the photodetector 19, as a fundamental wave component $R_1$ of the frequency $f_R$ of the ramp voltage Ra and harmonic wave components $R_2, \ldots, R_n, \ldots$ of frequencies which are integral multiples of the frequency $f_R$, as depicted in FIG. 10.

When the above-mentioned fundamental wave component $R_1$ or harmonic wave components $R_2, \ldots, R_n, \ldots$ agree with the image frequency $f_{ia}$ or $f_{ib}$ in the presence of a particular input angular rate, the fundamental wave component $R_1$ or harmonic wave components $R_2, \ldots, R_n, \ldots$ are mixed with the local signal Sca or Scb in the frequency mixer 52 of the phase difference detect/control section 50, by which the above-said component or components are converted to the intermediate frequency $f_r$ together with the component Vm of the frequency $f_m$. The fundamental wave component or harmonic wave components thus converted to the intermediate frequency $f_r$ are provided via the band-pass filter 53 to the AC amplifier 54 and the amplified output is fed to the synchronous detector 55, thus producing a scale factor error in the output of the fiber optic gyro.

Figure 11:
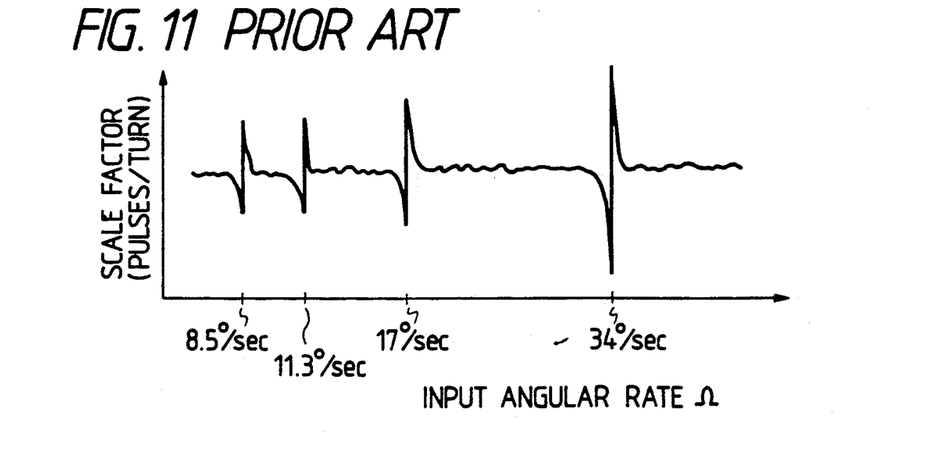
FIG. 11 is a graph showing, by way of example, variations of the scale factor with an input angular rate in the fiber optic gyro depicted in FIG. 1.

FIG. 11 shows the above-mentioned scale factor variations with the input angular rate $\Omega$ in the conventional fiber optic gyro shown in FIG. 1, the frequency $f_r$ being 10 kHz. The number of output pulses of the fiber optic gyro corresponding to the frequency $f_R$ of the ramp voltage Ra varies with the input angular rate $\Omega$, but the scale factor of the output from the fiber optic gyro, that is, the number of output pulses of the fiber optic gyro per rotation should be constant regardless of the input angular rate $\Omega$ as mentioned previously. However, as mentioned above, the maximun values of the phase shifts $\phi_a$ and $\phi_b$ do not accurately become $2\pi$ rad. because of the presence of the fly-back time in the ramp voltage Ra or the characteristics of the ramp voltage generator 40 and the ramp phase modulator 22, or since the intensity of light passing through the optical waveguide is modulated by the ramp voltage Ra in the ramp phase modulator 22; so that the number of output pulses of the fiber optic gyro per rotation deviates from a predetermined value in the vicinity of a particular input angular rate as depicted in FIG. 11, inducing a scale factor error in the output of the fiber optic gyro. The reason for a particularly large scale factor error in the vicinity of an input angular rate of 34°/sec in FIG. 11 is that the upper or lower side-band wave component U1 or L1 corresponding to the fundamental wave component of the frequency $f_R$ of the ramp voltage Ra agrees with the image frequency $f_{ia}$ or $f_{ib}$ as referred to previously with respect to FIG. 8.

SUMMARY OF THE INVENTION

It is therefore an object of the present invention to provide a zero serrodyne modulation system fiber optic gyro of a linear phase ramp method which is markedly small in the above-mentioned scale factor error and hence has a highly linear input/output characteristic.

According to an aspect of the present invention, an external signal which varies so that its integrated value is reduced to zero is added to the output of the phase difference detect/control section and the added output is applied to ramp voltage generator for varying the frequency of the ramp voltage. The external signal may be one that is composed of a plurality of sine-wave signals of different frequencies, or a sine-wave signal of a single frequency, so long as it is capable of varying the frequency of the ramp voltage, but this external signal may preferably be random noise.

In the fiber optic gyro of the above construction, the frequency of the ramp voltage fluctuates or oscillates with the external signal even in the presence of a particular input angular rate, that is, the frequency of the ramp voltage is fluctuated; this affords substantial reduction of the possibility that the upper or lower sideband wave component of the biasing voltage, or the fundamental or harmonic wave component of the ramp voltage which appears in the output of the photodetector in the presence of a particular input angular rate is converted into a predetermined intermediate frequency together with the frequency component of the biasing voltage and is applied via a band-pass filter to a synchronous detector. In addition, since the frequency of the ramp voltage is fluctuated in both directions of increasing and decreasing frequency, positive and negative scale factor errors cancel each other. Accordingly, the scale factor error which is induced in the fiber optic gyro in the presence of a particular input angular rate is substantially reduced, and hence the linearity of the input/output characteristic of the gyro is markedly improved.

According to another aspect of the present invention, the phase difference detect/control section includes an image frequency component detect/eliminate section in which the output of the photodetector is synchronously detected by a reference signal of an image frequency spaced apart from the frequency of the biasing voltage by a frequency twice higher than the intermediate frequency and the detected output is used to eliminate the detected output component of the image frequency component in the output of the photodetector from the synchronous detector output in the phase difference detect/control section.

With such an arrangement, the detected output component corresponding to the image frequency component in the photodetector output is removed from the synchronous detector output in the phase difference detect/control section by the synchronous detector output in the image frequency component detect/eliminate section. This affords substantial reduction of the scale factor error which is induced in the fiber optic gyro in the presence of a particular input angular rate due to the presence of the fly-back time in the ramp voltage. Hence, the linearity of the input/output characteristic of the gyro is remarkably improved.

DESCRIPTION OF THE PREFERRED EMBODIMENTS

Figure 12:
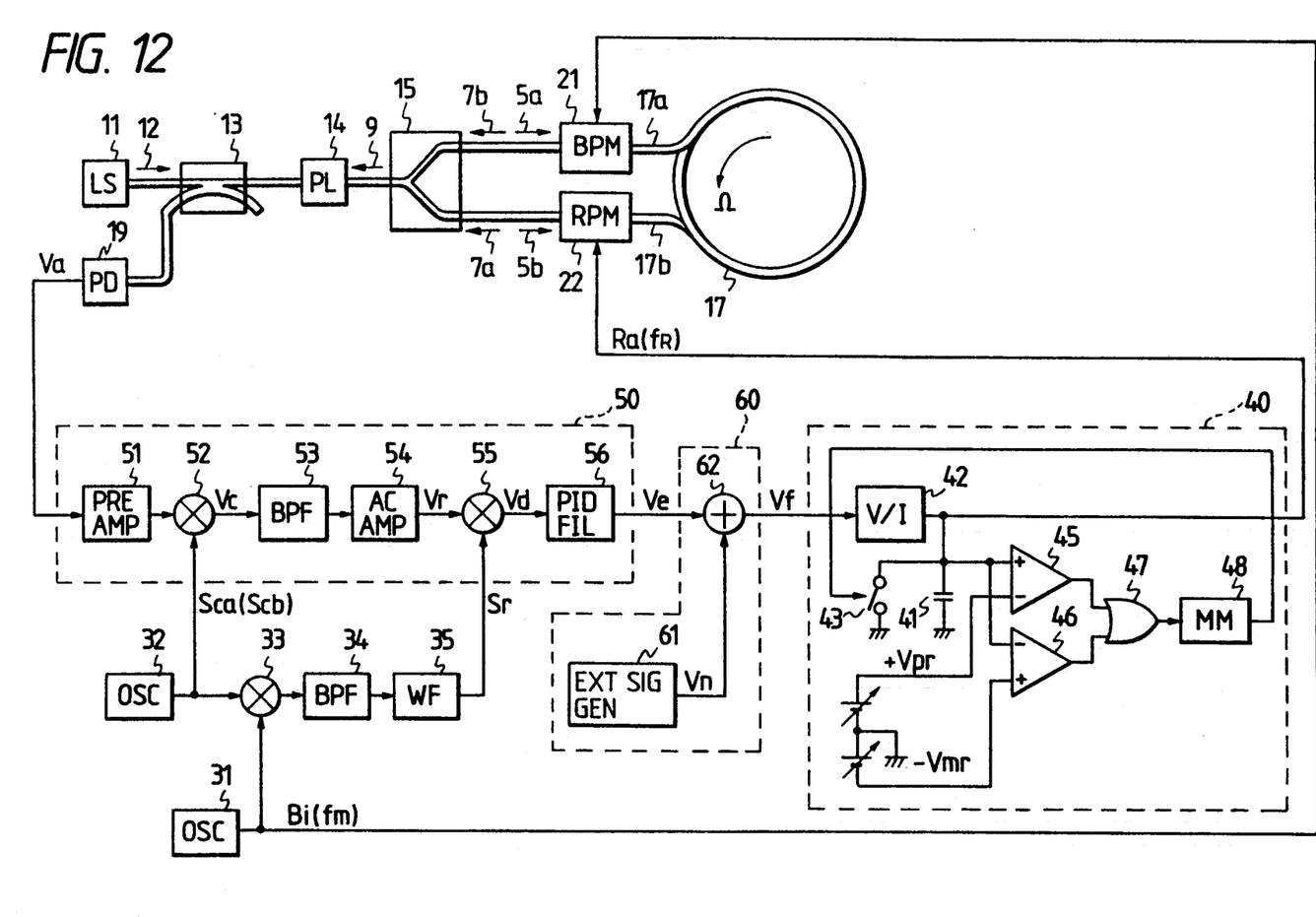
FIG. 12 is a block diagram illustrating an embodiment of the fiber optic gyro of the present invention.

FIG. 12 illustrates in block form an embodiment of the fiber optic gyro according to the present invention.

This embodiment is common to the prior art example of FIG. 1 in the inclusion of the light source 11, the optical coupler 13, the polarizer 14, the optical coupler 15, the optical fiber coil 17, the photodetector 19, the biasing phase modulator 21, the ramp phase modulator 22, the oscillator 31 forming the biasing voltage generator, the ramp voltage generator 40 and the phase difference detect/control section 50. In practice, a detector for detecting the polarity of the ramp voltage and a ramp frequency counter are provided, but they are not shown for the sake of brevity. The phase difference detect/control section 50 comprises the preamplifier 51, the frequency mixer 52, the band-pass filter 53, the AC amplifier 54, the synchronous detector 55 and the PID filter 56 as is the case with the prior art example of FIG. 1, and the operation of the section 50 is also the same as that of the prior art example except that the frequency $f_R$ of the ramp voltage Ra is varied by an external signal Vn as described later.

In this embodiment the ramp voltage generator 40 comprises a capacitor 41, a voltage-current converter 42 whereby an output voltage Vf of an external signal generate/add section 60, which is an input voltage to the ramp voltage generator 40, is converted to a current for input into the capacitor 41, a switch 43 for discharging the capacitor 41, a voltage comparator 45 for comparing the charging voltage of the capacitor 41 with a positive reference voltage $+V_{pr}$, a voltage comparator 46 for comparing the charging voltage of the capacitor 41 with a negative reference voltage $-V_{mr}$, an OR gate 47 for obtaining the OR of the outputs of the voltage comparators 45 and 46, and a monostable multivibrator 48 which is triggered by the output of the OR gate 47 to make the switch 43. Where the output voltage Ve of the phase difference detect/control section 50 goes positive and the output voltage Vf of the external signal generate/add section 60 goes positive, the capacitor 41 is charged positive, and when its charging voltage reaches the reference voltage $+V_{pr}$, the output of the voltage comparator 45 and consequently the output of the OR gate 47 goes high, by which the monostable multivibrator 48 is triggered, thereby turning ON the switch 43 to discharge therethrough the capacitor 41. By repeating this operation the positive ramp voltage Ra whose maximum value is equal to the reference voltage $+V_{pr}$ is developed across the capacitor 41, making the output voltage Ve of the phase difference detect/control section 50 negative. When the voltage Vf of the external signal generate/add section 60 goes negative, the capacitor 41 is charged negative. When the charging voltage reaches the reference voltage $-V_{mr}$, the output of the voltage comparator 46 and consequently the output of the OR gate 47 goes high, by which the monostable multivibrator 48 is triggered, thereby turning ON the switch 43 to discharge therethrough the capacitor 41. By repeating this operation a negative ramp voltage whose minimum value is equal to the reference voltage $-V_{mr}$ is developed, as the ramp voltage Ra, across the capacitor 41.

In this instance, a switching element which is sufficiently small in leakage current while in the OFF state and in resistance while in the ON state, such as a field effect transistor, is used as the switch 43, and the time constant of the monostable multivibrator 48 is set such that the ON time of the switch 43, i.e. the fly-back time of the ramp voltage Ra is sufficiently short.

In the present invention the external signal generate/add section 60 is provided between the phase difference detect/control section 50 and the ramp voltage generator 40. The external signal generate/add section 60 comprises an external generator 61 and an adder 62 by which an external signal Vn from external signal generator 61 is added to the output voltage Ve of the phase difference detect/control section 50 and the added output Vf is provided, as the output voltage of the external signal generate/add section 60, to the ramp voltage generator 40.

Figure 12A:
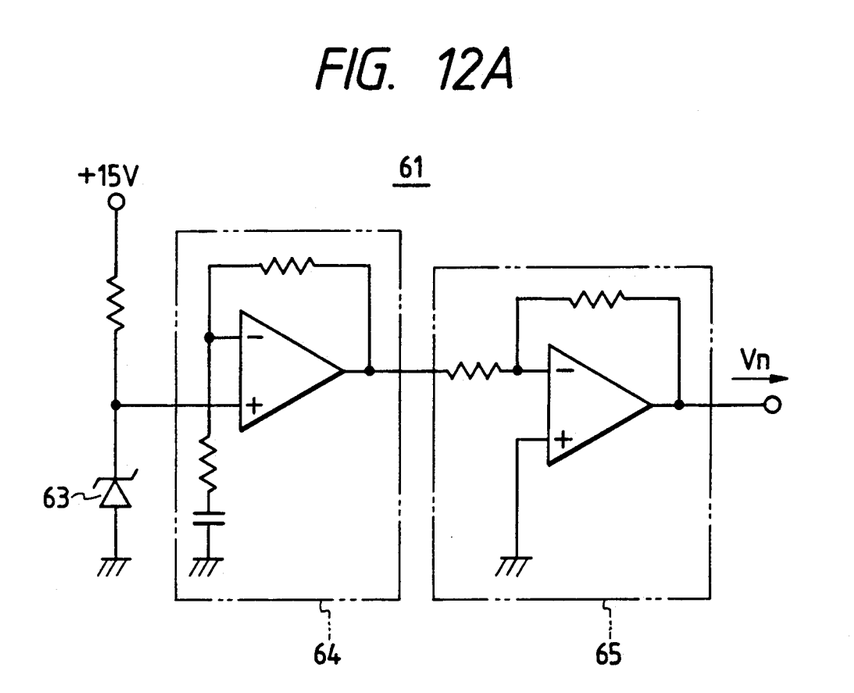
FIG. 12A is a circuit diagram showing a specific operative example of an external signal generator in FIG. 12.

The external signal generator 61 may be of any circuit construction as long as it creates a signal which varies so that the average level, or integration of its waveform may be reduced to zero; for example, a random noise generator such as shown in FIG. 12A can be employed. The random noise generator 61 has an arrangement in which shot noise, which is produced when current is applied to a diode 63, is multiplied by two amplifiers 64 and 65, each 1000 times and hence $10^6$ times in all, thus generating a random noise signal Vn of about $4V_{P-P}$. The random noise signal Vn thus produced is added by the adder 62 to the output Ve of the phase difference detect/control section 50 and the added output is applied to the ramp voltage generator 40 to raise and lower the frequency $f_R$ of the ramp voltage Ra.

Since the frequency $f_R$ of the ramp voltage Ra varies with the external signal Vn even in the presence of a particular input angular rate as mentioned above, that is, since the frequency $f_R$ of the ramp voltage Ra is fluctuated in both directions of increase and decrease, it is not very likely that the upper side-band wave components U1, U2, ... or lower side-band wave components L1, L2, ..., such as shown in FIG. 7, or the fundamental wave component $R_1$ or harmonic wave components $T_2$, ..., $R_n$, ..., such as shown in FIG. 10, are converted to the intermediate frequency $f_r$ together with the component Vm of the frequency $f_m$, thereafter being provided to the synchronous detector 55 via the band-pass filter 53 and the AC amplifier 54. In addition, since the frequency $f_R$ of the ramp voltage Ra is fluctuated in both directions of increase and decrease, positive and negative scale factor errors cancel each other. This affords substantial reduction of the scale factor error which is induced in the output of the fiber optic gyro in the presence of a particular input angular rate, and hence appreciably improves the linearity of the input/output characteristic of the gyro.

In concrete terms, when random noise is used as the external signal Vn, the scale factor error is reduced to about 1/5 that in the prior art.

The PID filter 56 in the phase difference detect/control unit 50 may be replaced with a filter of the same function.

According to the above-described embodiment of the present invention, since the frequency of the ramp voltage is varied by supplying the ramp voltage generator with an external signal added to the output of the phase difference detect/control section, the above-mentioned scale factor error in the output of the fiber optic gyro can be decreased materially, providing for remarkably improved linearity in the input/output characteristic of the gyro.

Figure 13:
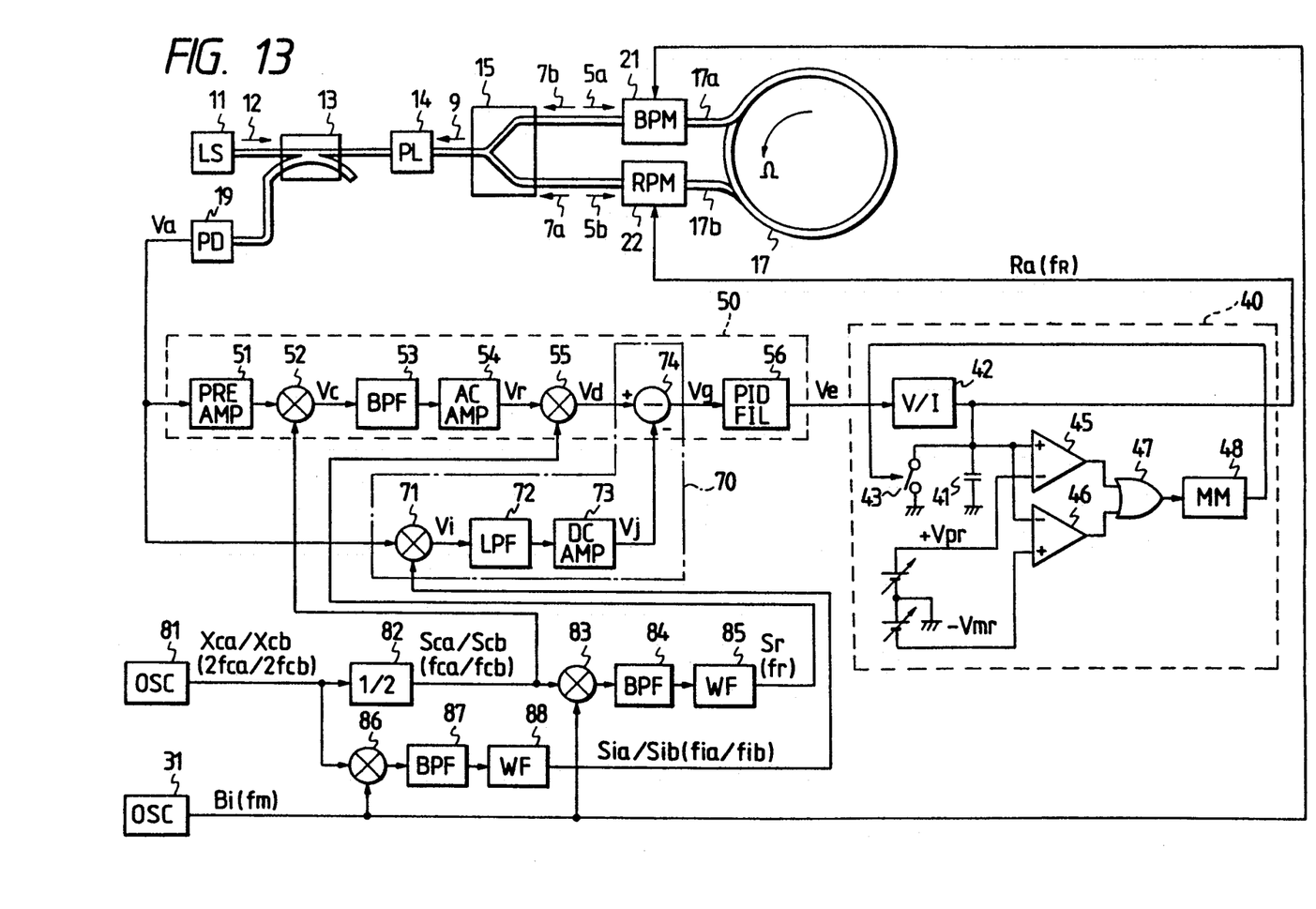
FIG. 13 is a block diagram illustrating another embodiment of the fiber optic gyro of the present invention.

FIG. 13 illustrates another embodiment of the present invention. This embodiment also includes the light source 11, the optical coupler 13, the polarizer 14, the optical coupler 15, the optical fiber coil 17, the photodetector 19, the biasing phase modulator 21, the ramp phase modulator 22, the oscillator 31 forming the biasing voltage generator, the ramp voltage generator 40 and the phase difference detect/control section 50 as in the prior art example depicted in FIG. 1. A detector for detecting the polarity of the ramp voltage Ra and a ramp frequency counter are not shown for the sake of brevity. The phase difference detect/control section 50 also comprises the preamplifier 51, the frequency mixer 52, the band-pass filter 53, the AC amplifier 54, the synchronous detector 55 and the PID filter 56 as is the case with the conventional fiber optic gyro shown in FIG. 1. The phase difference detect/control section 50 in this embodiment performs the same operation as in the conventional gyro except that a detected output component corresponding to the component of the frequency $f_{ia}=f_m+2f_r$ or $f_{ib}=f_m-2f_r$ in the output Va of the photodetector 19 is removed from the output Vd of the synchronous detector 55 in the phase difference detect/control section 50 as described later. The ramp voltage generator 40 is identical in construction and in operation with that depicted in FIG. 12.

In this embodiment an image frequency component eliminate section 70 is provided in association with the phase difference detect/control section 50. The image frequency component eliminate section 70 is made up of a synchronous detector 71, a low-pass filter 72, a DC amplifier 73, and a subtractor 74. Where the local signal Sca of the frequency $f_{ca}=f_m+f_r$ is mixed with the AC component of the output Va of the photodetector 19 in the frequency mixer 52 of the phase difference detect/control section 50, the synchronous detector 71 synchronously detects the output Va of the photodetector 19 by a reference signal Sia of a frequency equal to the image frequency $f_{ia}=f_m+2f_r$, thus detecting the component of the frequency $f_{ia}$ in the output Va of the photodetector 19. Alternatively, in the case where the local signal Scb of the frequency $f_{cb}=f_m-f_r$ is mixed with the AC component of the output Va of the photodetector 19 in the frequency mixer 52 of the phase difference detect/control section 50, the synchronous detector 71 synchronously detects the component of the frequency $f_{ib}$ in the output Va of the photodetector 19 by a reference signal Sib of a frequency equal to the image frequency $f_{ib}=f_m-2f_r$, thus detecting the component of the frequency $f_{ib}$ in the output Va of the photodetector 19. The DC component of the output Vi of the synchronous detector 71 is extracted by the low-pass filter 72 and is amplified by the DC amplifier 73. The subtractor 74 subtracts the output Vj of the DC amplifier 73 from the output Vd of the synchronous detector 55 of the phase difference detect/control section 50. The gain of the DC amplifier 73 is set so that its output Vj may be of a level equal to the detected output component of the image frequency $f_{ia}$ or $f_{ib}$ in the output Va of the photodetector 19 contained in the output Vd of the synchronous detector 55. The output Vg of the subtractor 74 is applied to the PID filter 56 in the phase difference detect/control section 50.

As described previously, owing to the presence of the fly-back time in the ramp voltage Ra which is applied to the ramp phase modulator 22 for phase modulation, an error composed of the fundamental and harmonic wave components of the frequency $f_R$ of the ramp voltage Ra is induced in the phase difference between the two rays of light 7a and 7b which have propagated through the optical fiber coil 17 in opposite directions and interfere with each other. This error appears as the upper and lower side-band wave components U1, U2, ... and L1, L2, ... of the component Vm of the frequency $f_m$ in the output Va of the photodetector 19 as shown in FIG. 7. As exemplified in FIG. 8 or 9, if any one of the upper and lower side-band wave components U1, U2, ... and L1, L2, ... agrees with the image frequency $f_{ia}$ or $f_{ib}$, the side-band wave component is mixed with the local signal Sca or Scb of the frequency $f_{ca}$ or $f_{cb}$ in the frequency mixer 52 of the phase difference detect/control section 50 and is converted to the intermediate frequency $f_r$ together with the component Vm of the frequency $f_m$. The side-band wave component thus converted to the intermediate frequency $f_r$ is amplified by the AC amplifier 54 and is then synchronously detected by the reference signal Sr of the frequency $f_r$ in the synchronous detector 55. Consequently, the output Vd of the synchronous detector 55 includes the detected output component of the side-band wave component converted to the intermediate frequency $f_r$, that is, the component of the image frequency $f_{ia}$ or $f_{ib}$ contained in the output Va of the photodetector 19. In the embodiment shown in FIG. 13, however, the detected output component corresponding to the component of the image frequency $f_{ia}$ or $f_{ib}$ in the output Va of the photodetector 19 is removed, in the subtractor 74, from the output Vd of the synchronous detector 55 by the output Vj of the DC amplifier 73; so that the aforementioned scale factor error is substantially reduced and the linearity of the input/output characteristic of the fiber optic gyro is markedly improved.

The local signal Sca or Scb of the frequency $f_{ca}$ or $f_{cb}$ which is applied to the frequency mixer 52 of the phase difference detect/control section 50 is obtained by frequency dividing a signal Xca or Xcb of a frequency $2f_{ca}$ or $2f_{cb}$ from an oscillator 81 down to ½ by a frequency divider 82. The reference signal Sr of the frequency $f_r$ which is applied to the synchronous detector 55 of the phase difference detect/control section 50 is obtained as follows: That is, the biasing voltage Bi of the frequency $f_m$ from the oscillator 31 and the local signal Sca or Scb of the frequency $f_{ca}$ or $f_{cb}$ from the frequency divider 82 are mixed together in a frequency mixer 83, the mixer output is applied to a band-pass filter 84 of the center frequency $f_r$ and the filter output is waveform shaped by a waveform shaping circuit 85 into a rectangular wave signal of the frequency $f_r$ which is used as the reference signal Sr. The reference signal Sia or Sib of the frequency $f_{ia}$ or $f_{ib}$ which is applied to the synchronous detector 71 of the image frequency component detect-/eliminate section 70 is produced in the following manner: That is, the biasing voltage Bi of the frequency $f_m$ from the oscillator 31 and the signal Xca or Xcb of the frequency $2f_{ca}$ or $2f_{cb}$ from the oscillator 81 are mixed together in a frequency mixer 86, the output of which is applied to a band-pass filter 87 of the center frequency $f_{ia}$ or $f_{ib}$ to extract only the signal of the frequency $f_{ia}$ or $f_{ib}$, which is provided to a waveform shaping circuit 88, obtaining a rectangular wave signal of the frequency $f_{ia}$ or $f_{ib}$ which is used as the above-mentioned reference signal Sia or Sib.

It is apparent that the arrangement for eliminating the image frequency components explained above can also be incorporated into the embodiment shown in FIG. 12.

As described above, according to the present invention, it is possible to greatly reduce the scale factor error which is induced in the output of the fiber optic gyro in the presence of a particular input angular rate due to the presence of the fly-back time in the ramp voltage which is applied to the ramp phase modulator for phase modulation. Hence, the linearity of the input/output characteristic of the fiber optic gyro can be improved materially.

It will be apparent that many modifications and variations may be effected without departing from the scope of the novel concepts of the present invention.

What is claimed is:

1. A fiber optic gyro comprising:
   a light source;
   an optical fiber coil;
   an optical coupler whereby light from said light source is split into two for input into said optical fiber coil at one end and at the other end thereof, respectively, and two rays of light having propagated through said optical fiber coil in opposite directions and output therefrom are caused to interfere with each other;
   a photodetector for detecting said interference light available from said optical coupler;
   a biasing phase modulator disposed between said optical coupler and one end of said optical fiber coil;
   a biasing voltage generator for generating a phase modulating biasing voltage of a predetermined frequency which is applied to said biasing phase modulator;
   a ramp phase modulator disposed between said optical coupler and the other end of said optical fiber coil;
   a ramp voltage generator for generating a phase modulating ramp voltage which is applied to said ramp phase modulator;
   a phase difference detect/control section whereby a phase difference between said two rays of light interfering with each other in said optical coupler is detected from the output of said photodetector and said ramp voltage generator is controlled by said detected output so that said phase difference may be of a predetermined value;
   external signal generating means for generating a varying external signal; and
   external signal adding means whereby external signal is added to the output of said phase difference detect/control section and said added output is applied to said ramp voltage generator to thereby fluctuate the frequency of said ramp voltage.

2. The fiber optic gyro of claim 1, wherein said external signal generating means is a random noise generator for generating random noise as said external signal.

3. The fiber optic gyro according to claim 1 or 2, wherein said fiber optic gyro further includes a local signal generating means for generating a local signal of a frequency spaced apart from said predetermined frequency by an intermediate frequency, and wherein said phase difference detect/control section includes a frequency mixer whereby said local signal is mixed with the output of said photodetector and a synchronous detector means whereby a component of said intermediate frequency in the output of said frequency mixer is synchronously detected using a reference signal of the same frequency as said intermediate frequency.

4. A fiber optic gyro comprising:
   a light source;
   an optical fiber coil;
   an optical coupler whereby light from said light source is split into two for input into said optical fiber coil at one end and at the other end thereof, respectively, and two rays of light having propagated through said optical fiber coil in opposite directions and output therefrom are caused to interfere with each other;
   a photodetector for detecting said interference light available from said optical coupler;
   a biasing phase modulator disposed between said optical coupler and one end of said optical fiber coil;
   a biasing voltage generator for generating a phase modulating biasing voltage of a predetermined frequency which is applied to said biasing phase modulator;
   a ramp phase modulator disposed between said optical coupler and the other end of said optical fiber coil;
   a ramp voltage generator for generating a phase modulating ramp voltage which is applied to said ramp phase modulator;

a local signal generating means for generating a local signal of a frequency spaced apart from said predetermined frequency by an intermediate frequency;

a phase difference detect/control section whereby a phase difference between said two rays of light interfering with each other in said optical coupler is detected from the output of said photodetector and said ramp voltage generator is controlled by said detected output so that said phase difference may be of a predetermined value, said phase difference detect/control section including a frequency mixer whereby said local signal is mixed with the output of said photodetector and first synchronous detector means whereby a component of said intermediate frequency in the output of said frequency mixer is synchronously detected using a first reference signal of the same frequency as said intermediate frequency;

reference signal generator means for generating a second reference signal of an image frequency spaced apart from said predetermined frequency by a value twice said intermediate frequency;

second synchronous detector means for synchronously detecting the output of said photodetector by said second reference signal of said image frequency; and image frequency component eliminator means whereby a detected output component of said image frequency in the output of said photodetector is eliminated from the output of said first synchronous detector means by the output of said second synchronous detector means;

wherein the output of said image frequency component eliminator means is applied to said ramp voltage generator.

5. The fiber optic gyro according to claim 4, wherein said reference signal generator means includes an oscillator means for generating a signal of the same frequency as twice the frequency of said local signal and a second frequency mixer for frequency-mixing the outputs from said oscillator means and said biasing voltage generator to produce said second reference signal, and wherein said local signal generating means includes frequency divider means for frequency-dividing the output of said oscillator means to produce said local signal.

6. The fiber optic gyro according to claim 4 or 5, further including external signal generating means for generating a varying external signal and external signal adding means whereby said external signal is added to the output of said phase difference detect/control section and said added output is applied to said ramp voltage generator to thereby fluctuate the frequency of said ramp voltage.

7. The fiber optic gyro according to claim 6, wherein said external signal generating means is a random noise generator for generating random noise as said external signal.

* * * * *